United States Patent
Goslin (10) Patent No.: US 11,615,715 B2
(45) Date of Patent: Mar. 28, 2023

(54) SYSTEMS AND METHODS TO IMPROVE BRUSHING BEHAVIOR

(71) Applicant: Disney Enterprises, Inc., Burbank, CA (US)

(72) Inventor: Michael P. Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 468 days.

(21) Appl. No.: 16/852,160

(22) Filed: Apr. 17, 2020

(65) Prior Publication Data

US 2021/0327297 A1    Oct. 21, 2021

(51) Int. Cl.
| | |
|---|---|
| *G06F 3/16* | (2006.01) |
| *A46B 9/04* | (2006.01) |
| *G09B 19/00* | (2006.01) |
| *G10L 25/51* | (2013.01) |
| *A46B 15/00* | (2006.01) |
| *A46B 5/00* | (2006.01) |

(52) U.S. Cl.
CPC .......... *G09B 19/0084* (2013.01); *A46B 5/00* (2013.01); *A46B 9/04* (2013.01); *A46B 15/004* (2013.01); *A46B 15/0004* (2013.01); *A46B 15/0044* (2013.01); *A46B 15/0046* (2013.01); *G06F 3/16* (2013.01); *G10L 25/51* (2013.01); *A46B 2200/1066* (2013.01)

(58) Field of Classification Search
CPC .......... G06F 3/16; A46B 15/0008; A46B 9/04
See application file for complete search history.

(56) References Cited

U.S. PATENT DOCUMENTS

| | | | |
|---|---|---|---|
| 5,990,405 | A | 11/1999 | Auten |
| 8,961,309 | B2 | 2/2015 | Dutilly |
| 2006/0287088 | A1* | 12/2006 | Mashimo ............ A63F 13/2145 463/37 |
| 2007/0180978 | A1 | 8/2007 | Ozaki |
| 2007/0221046 | A1 | 9/2007 | Ozaki |

(Continued)

FOREIGN PATENT DOCUMENTS

EP    1081680 A1    3/2001

OTHER PUBLICATIONS

International Search Report dated Aug. 18, 2008 for PCT/US2008/061915.

(Continued)

*Primary Examiner* — Michael D Jennings
(74) *Attorney, Agent, or Firm* — Esplin & Associates, PC (57) ABSTRACT

This disclosure presents systems and methods to improve user brushing behavior. Exemplary implementations may: effectuate presentation of audio content via an audio output device, the audio content being characterized by an audio profile; obtain output signals from one or more sensors coupled to a user device, the output signals conveying user input information, the user input information defining user input by a user via the user device; determine, based on the user input information, a user profile, the user profile including one or more user values of the one or more audio attribute; compare the user profile with the audio profile to determine, for individual audio attributes, one or more differences; determine one or more scores reflecting the one or more differences; and/or perform other operations.

20 Claims, 4 Drawing Sheets

(56) References Cited

U.S. PATENT DOCUMENTS

2008/0102958 A1    5/2008  Kitamura
2008/0113698 A1    5/2008  Egozy
2008/0280680 A1   11/2008  Dutilly
2015/0317837 A1*  11/2015  Sholudko ................ G06F 3/005
                                                    345/633
2020/0401211 A1*  12/2020  Lympouridis .......... A61B 5/097

OTHER PUBLICATIONS

Ransom-Wiley, "Ubisoft 'Jam Sessions' turns DS into guitar"; retrieved from http://www.joystiq.com/2007/03/08/ubisoft-jam-sessions-turns-ds-into-guitar/, Mar. 8, 2007.
Geiger, "Using the Touch Screen as a Controller for Portable Computer Music Instruments"; NiME 06, Jun. 4-8, Paris, France.
NDS Hiite Utaeru DS Guitar M-06; retrieved from http://www.ncsx.com/2007/012907/hiite_utaeru_ds.htm. Jan. 29, 2007.
Davies, "DS Guitar M-06 hits Japan": retrieved from http://www.pocketgamer.co.uk, Feb. 7, 2007.
Lumb, "DS Guitar Software Cominq to Japan"; retrieved from http://www.1up.com, Nov. 8, 2006.
Preview: Hiite Utaeru DS Guitar M-06 (DS):; retrieved from http://www.el33tonline.com/main/show_review/80, Dec. 15, 2006.
Harris. "E3 2006: Elite Beat Agents"; retrieved from http://ds.iqn.com/articles/705/705544p1.html, May 10, 2006.
Devries, "E3 2006: The Little Mermaid DS"; retrieved from http://ds.iqn.com/articles/707/707347p1 .html, May 10, 2006.
Guitar Hero (series); Wikipedia; retrieved from http://en.wikipedia.orq/wiki/Guitar_Hero (series), Jan. 24, 2008.
Dance Dance Revolution; Wikipedia; retrieved from http://en.wikipedia.orq/wiki/Dance_Dance_Revolution, Jan. 24, 2008.

* cited by examiner

SYSTEMS AND METHODS TO IMPROVE BRUSHING BEHAVIOR

FIELD

This disclosure relates to systems and methods to improve user brushing behavior.

BACKGROUND

Some toothbrushes have timers indicating how long to brush teeth and/or when to switch sides.

SUMMARY

Many people who brush their teeth do not spend enough time actually brushing their teeth. Toothbrush makers have added features to electric toothbrushes to try to get people to brush properly. Early features include a timer that tells the user when to switch sides and stop. More recent toothbrushes have included wireless communication capability so that it can connect to your phone and track your brushing over time. None of the toothbrush makers have tried to make the toothbrush experience more fun, though. One or more aspects of the present disclosure contemplate systems, devices, and/or methods to keep people brushing for the right amount of time by making it more fun. To this end, a user device (e.g., toothbrush) may include an audio input device and/or other sensors. While it may be hard to sing words while brushing your teeth, it may be fairly easy to hum. A song or music may be played. The user device may detect whether the user is humming correctly, and a score at the end of the toothbrushing performance may be determined. In some implementations, points and prizes can be awarded and/or achievements unlocked based on how well the person hummed and/or whether they brushed for the correct amount of time (and/or other measures, such as correct pressure, angle of brush, etc.). These and/or other features may be processed by onboard processors, and/or by connecting the user device to a computing platform and having the experience through an application.

One or more implementations of a system configured to improve user brushing behavior may include one or more of one or more user devices, one or more computing platforms, and/or other components. A user device may include one or more of non-transitory electronic storage, one or more physical processors, and/or other components. The user device may communicate with one or more computing platforms via client/server architecture, and/or other communication schemes. The user device and/or the computing platforms may communicate with one or more servers via client/server architecture, and/or other communication schemes. In some implementations, the features and/or functionality attributed to user device may be carried by individual computing platforms and/or individual servers.

The one or more physical processors may be configured by machine-readable instructions. Executing the machine-readable instructions may cause the one or more physical processor to facilitate improving user brushing behavior. The machine-readable instructions may include one or more computer program components. The computer program components may include one or more of an audio output component, sensor component, audio assessment component, and/or other components.

The audio output component may be configured to effectuate presentation of audio content and/or other audio information. The presentation of the audio content may be via an audio output device. The audio content may be characterized by an audio profile and/or other information. The audio profile may include one or more presentation values of one or more audio attributes and/or other information. The one or more presentation values may reflect auditory characteristics of the audio content as presented via the audio output device. The one or more audio attributes may include one or more of a duration attribute, a pitch attribute, an intensity attribute, a tone attribute, a timbre attribute, a volume attribute, a key attribute, a tempo attribute, and/or other attributes. By way of non-limiting illustration, the audio content may be characterized by a first presentation value of a first audio attribute.

The sensor component may be configured to obtain output signals from one or more sensors coupled to a user device. The output signals may convey user input information and/or other information. The user input information may define user input by a user via the user device. The user device may comprise a toothbrush. The toothbrush may include one or more of a brush head, a handle, and/or other components. The audio output device may be in the handle of the toothbrush. The one or more sensors may be in the brush head of the toothbrush.

The audio assessment component may be configured to determine a user profile and/or other information. Determining the user profile may be based on the user input information and/or other information. The user profile may include one or more user values of the one or more audio attributes. The one or more user values may reflect auditory characteristics of the user input via the one or more sensors. In some implementations, the user profile may include a first user value of the first audio attribute determined based on the user input information.

The audio assessment component may be configured to compare the user profile with the audio profile. Such comparison may determine, for individual audio attributes, one or more differences between individual presentation values and individual user values of the individual audio attributes. In some implementations, the one or more differences may include a first difference between the first presentation value and the first user value.

The audio assessment component may be configured to determine one or more scores reflecting the one or more differences. By way of non-limiting illustration, a first score may be determined based on the first difference.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect.

These and other objects, features, and characteristics of the system and/or method disclosed herein, as well as the methods of operation and functions of the related elements of structure and the combination of parts and economies of manufacture, will become more apparent upon consideration of the following description and the appended claims with

DETAILED DESCRIPTION

Figure 1:
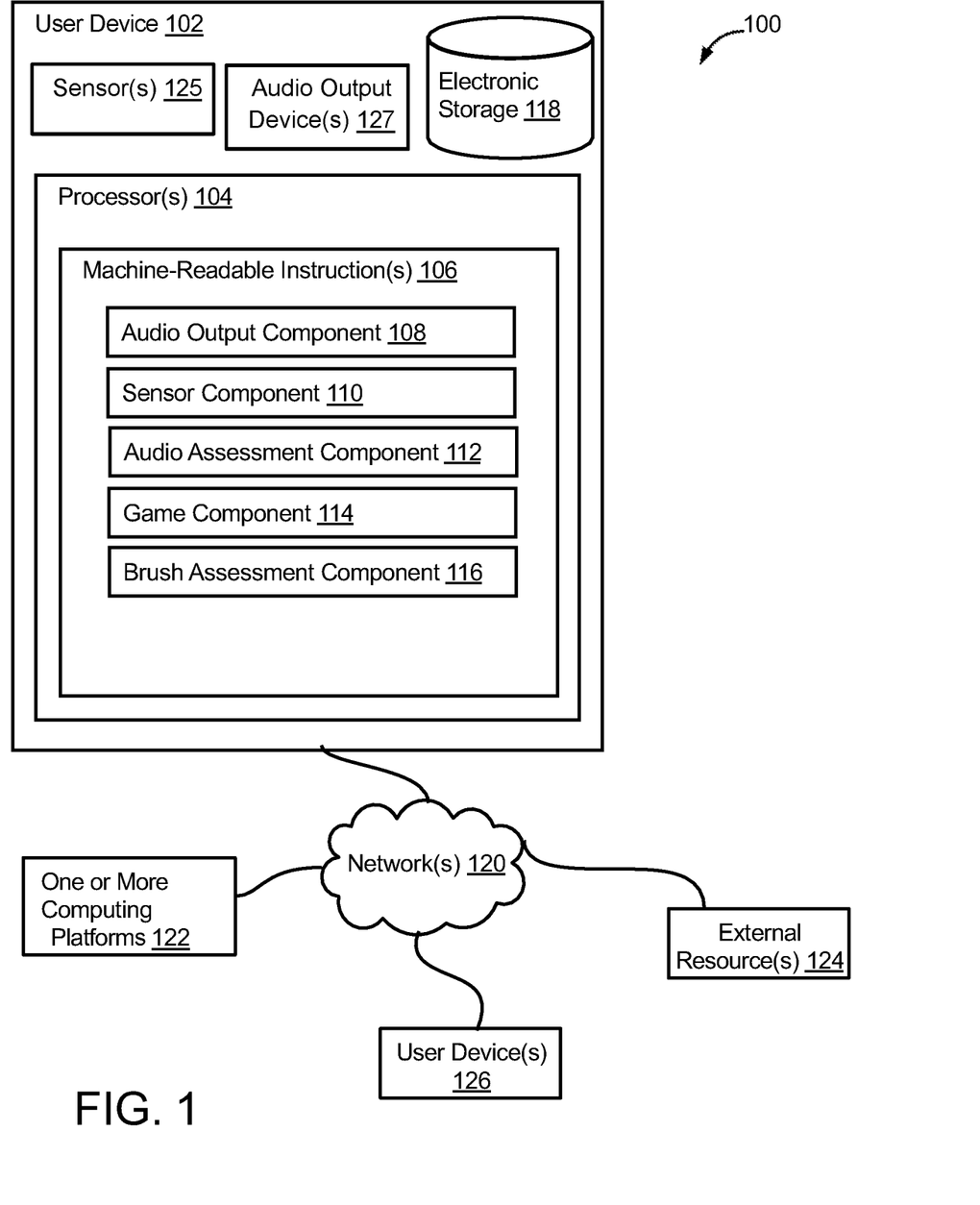
FIG. 1 illustrates a system configured to improve user brushing behavior, in accordance with one or more implementations.

FIG. 1 illustrates a system 100 configured to improve user brushing behavior, in accordance with one or more implementations. While dentists suggest singing a song for 2 minutes to have you brush your teeth, never has a toothbrush maker actually tried to measure whether (and how well) the user has been singing/humming for those 2 minutes. To this end, a user device 102 (e.g., toothbrush) may include an audio input device and/or other sensors. While it may be hard to sing words while brushing your teeth, it may be fairly easy to hum. A song may be played. The user device 102 may detect whether the user is humming correctly, and a score at the end of the toothbrushing performance may be determined. In some implementations, points and prizes can be awarded and/or achievements unlocked based on how well the person hummed and whether they brushed for the correct amount of time (other measures, such as correct pressure, angle of brush, etc.). These and/or other features may be processed by onboard processors and/or by connecting the user device 102 to a computing platform and having the experience through an application.

The system 100 may include one or more of user device 102, one or more computing platforms 122, one or more other user devices 126, and/or other components. The user device 102 may include one or more of one or more physical processors 104, non-transitory electronic storage 118, one or more sensors 125, one or more audio output devices 127, a display (not shown in FIG. 1), and/or other components. The non-transitory electronic storage 118 may be configured to store information utilized by user device 102, one or more computing platforms 122, a display (not shown in FIG. 1), and/or other components of system 100.

In some implementations, the features and/or functionality attributed to user device 102 may be carried out by individual computing platforms and/or individual servers (not shown). The one or more computing platforms 122 may be remotely located from user device 102. The user device 102 may communicate with one or more computing platforms 122 via client/server architecture, and/or other communication schemes. The user device 102 and/or individual computing platforms may communicate with one or more servers via client/server architecture, and/or other communication schemes.

By way of non-limiting illustration, individual computing platforms of one or more computing platform 122 may download an application (e.g., non-transitory electronically stored information) configured to provide access to features and/or functions of machine-readable instructions 106. In some implementations, one or more features and/or functions of user device 102 may be attributed as local features and/or functions of one or more computing platforms 122. For example, individual computing platforms of one or more computing platforms 122 may obtain and/or include machine-readable instructions that may be the same or similar to machine-readable instructions 106 of the one or more physical processors 104. Individual computing platforms may include one or more of a mobile computing platform (e.g., one or more of a cellular telephone, a smartphone, a laptop, a tablet computer, a virtual reality platform, an augmented reality platform, and/or other computing platforms), a stationary computing platform (e.g., a desktop computer), and/or other computing platforms.

User device 102 may include one or more of a display (not shown in FIG. 1), one or more sensors 125, one or more audio output devices 127, one or more wireless communication devices (not shown in FIG. 1), and/or other components. A display may be configured to present one or more of individual images, image sequences, video, text, and/or other information. Presentation via a display may be facilitated by a graphics processing unit (GPU) and/or other components. A display may include one or more of display screen, a touchscreen, a monitor, a head-mounted display, a set of screens, a light source, and/or other displays. A display screen may include, for example, a liquid-crystal display (LCD) screen and/or other displays screens. A light source may include one or more of a light-emitting diode, laser, a light bulb, and/or other light sources. In some implementations, user device 102 may include devices configured to provide tactile output. A tactile output device may include one or more of a heating element, a vibration motor, and/or other tactile output devices.

An audio output device of one or more audio output device may be configured to present audio content in the form of words, sounds, music, and/or other audio content. By way of non-limiting example, the audio content may include a song and/or other audio content. An audio output device may include one or more of a speaker, a bone conduction speaker, and/or other devices. One or more wireless communication devices may be configured to facilitate connections between the one or more processors, the individual computing platforms, and/or the individual user devices. A wireless communication device may include a device configured to be engaged in wireless communication. Wireless communication may include one or more of radio communication, Bluetooth communication, Wi-Fi communication, cellular communication, infrared communication, and/or other wireless communication. A wireless communication device may include one or more of an antenna, a Bluetooth device, Wi-Fi device, and/or other devices.

Individual sensors of one or more sensors 125 may be configured to generate output signals conveying user input information and/or other information. The user input information may define user input by a user via the user device 102. The one or more sensors 125 may include one or more of an audio input sensor, an image sensor, an orientation sensor, a location sensor, a pressure sensor, a temperature sensor, a light sensor, and/or other sensors.

An audio input sensor may be configured to receive audio input. An audio input sensor may be configured to generate user input information in the form of audio information and/or other information. The audio information may convey audio characteristics of the received audio input. An audio input sensor may include a sound transducer and/or other sensor configured to convert sound (e.g., air pressure variation) into an electrical signal. By way of non-limiting illustration, an audio input sensor may include a microphone.

An image sensor may be configured to generate output signals conveying user input information in the form of image information and/or other information. The image information may define visual content in the form of one or more images. Images may be defined by pixels and/or other information. Pixels may be characterized by one or more of pixel location, pixel color, pixel transparency, and/or other information. An image sensor may include one or more of charge-coupled device sensor, active pixel sensor, complementary metal-oxide semiconductor sensor, N-type metal-oxide-semiconductor sensor, and/or other image sensor. The image information may facilitate determination of other information described herein via one or more image-based techniques. By way of non-limiting illustration, techniques may include one or more of computer vision, Speeded Up Robust Features (SURF), Scale-invariant Feature Transform (SIFT), Oriented FAST and rotated BRIEF (ORB), Optical Character Recognition (OCR), facial recognition, and/or other techniques.

In some implementations, an orientation sensor may be configured to generate output signals conveying user input information in the form of orientation information and/or other information. Orientation information derived from output signals of an orientation sensor may define an orientation of user device 102. In some implementations, orientation may refer to one or more of a pitch angle, a roll angle, a yaw angle, heading, pointing direction, and/or other measurements. An orientation sensor may include an inertial measurement unit (IMU) and/or other sensors. An orientation sensor may include one or more of an accelerometer, a gyroscope, a magnetometer, Inclinometers, Electronic nose, Infrared Imagers, Micro-bolometers, micro-displays (DMD), Digital micro-mirror device, Optical Switches, and/or other devices.

In some implementations, a location sensor may be configured to generate output signals conveying user input information in the form of location information and/or other information. Location information derived from output signals of a location sensor may define one or more of a geo-location, an elevation, and/or other measurements. A location sensor may include one or more of a GPS, an altimeter, and/or other devices.

A pressure sensor may be configured to generate output signals conveying user input information in the form of pressure information and/or other information. Pressure information derived from output signals of a pressure sensor may define a force per unit area imparted to the pressure sensor. A pressure sensor may include one or more of a piezo resistive strain gauge, a capacitive pressure sensor, an electromagnetic pressure sensor, a piezoelectric sensor, a strain-gauge, and/or other pressure sensors.

A temperature sensor may be configured to generate output signals conveying user input information in the form of temperature information and/or other information. Temperature information derived from output signals of a temperature sensor may define one or more of a temperature at the temperature sensor, temperature within a threshold range of the temperature sensor, and/or other measurements of temperature. A temperature sensor may include one or more of a thermocouple, a resistive temperature Measuring devices, an infrared sensor, a bimetallic device, a thermometer, and/or other temperature sensors.

A light sensor may be configured to generate output signals conveying user input information in the form of ambient light information and/or other information. The ambient light information derived from output signals of a light sensor may define intensity and/or presence (or absence) of light or other electromagnetic radiation incident on the light sensor. A light sensor may include one or more of a photodiode, an active-pixel sensor, photovoltaic, and/or other sensors.

In some implementations, user device 102 may include one or more physical input devices through which a user may provide input. By way of non-limiting illustration, a physical input device may include one or more of a physical button, a switch, a fingerprint reader, and/or other devices.

Figure 3:
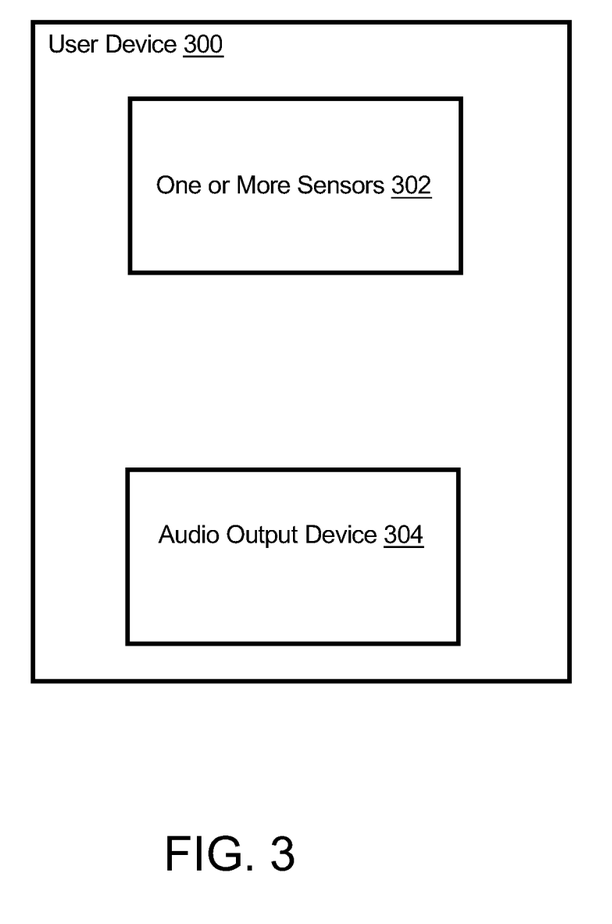
FIG. 3 illustrates a user device, in accordance with one or more implementations.

FIG. 3 illustrates a user device 300, in accordance with one or more implementations. The user device 300 may be the same as or similar to user device 102 in FIG. 1. User device 300 may include one or more of one or more sensors 302, an audio output device 304, and/or other components. In some implementations, user device 300 may comprise a toothbrush. The toothbrush may include one or more of a brush head, a handle, and/or other components. The audio output device 304 may be in the handle of the toothbrush. By way of non-limiting illustration, the audio output device 304 may be disposed within a cavity formed in the handle. The one or more sensors 302 may be in the brush head of the toothbrush. By way of non-limiting illustration, the one or more sensors 302 may be disposed at and/or proximate to bristles of the brush head.

Referring back to FIG. 1, the one or more physical processors 104 may be configured by machine-readable instructions 106. Executing machine-readable instructions 106 may cause one or more physical processors 104 to improve user brushing behavior. The machine-readable instructions 106 may include one or more computer program components. The one or more computer program components may include one or more of an audio output component 108, a sensor component 110, an audio assessment component 112, a game component 114, a brush assessment component 116, and/or other components.

Audio output component 108 may be configured to effectuate presentation of audio content and/or other audio information. The presentation of the audio content may be via one or more audio output devices 127. The audio content may be characterized by an audio profile and/or other information. The audio profile may include one or more presentation values of one or more audio attributes and/or other values. In some implementations, one or more presentation values may be specified for individual attributes for individual notes produced by the audio content, at individual points in time, over individual portions of the audio content, and/or may be expressed in other ways. In some implementations, an individual value may be specified in terms of a system defined value (e.g. normalized number, one or more bytes, etc.) as limited by one or more of software, hardware, and/or communication protocol definitions.

The one or more audio attributes may include one or more of a duration attribute, a pitch attribute, an intensity attribute, a tone attribute, a timbre attribute, a key attribute, a volume attribute, a tempo attribute, and/or other attributes. As such, in some implementations, the audio content may be characterized by a first presentation value of a first audio attribute.

A value of a duration attribute may specify a duration of the audio content. The duration may be specified based on units of time. By way of non-limiting illustration, duration may be expressed as one or more of second, minutes, and/or other units of time.

A value of a pitch attribute may specify a frequency of sound. In some implementations, the value may be specified as a qualitative value such as one or more of "high," "mid," "low" and/or other descriptive terms. In some implementations, the value may be specified as a quantitative value such as a measurement in terms of Hertz.

A value of an intensity attribute may specify a sound power per unit area of sound. In some implementations, the value may be specified as a qualitative value such as one or more of "high," "mid", "low," and/or other descriptive terms. In some implementations, the value may be specified as a quantitative value such as a measurement in terms of sound waves per unit area.

A value of a tone attribute may specify a tonal quality of sound. In some implementations, the value may be specified as a qualitative value such as one or more of "high," "mid," "low," "low-rising," "falling," and/or other descriptive terms. In some implementations, the value may be specified as a quantitative value such as a measurement in terms of Hertz.

A value of a timbre attribute may specify a perceived sound quality of sound. The physical characteristics of sound that may determine the perception of timbre may include one or both of spectrum and/or envelope.

A value of a key attribute may specify a musical key of sound. In some implementations, the value may be specified as a qualitative value such as one or more of "key of G," "key of C," and/or other descriptive terms. In some implementations, the value may be specified as a quantitative value such as a measurement in terms of harmonic frequency.

A value of a volume attribute may specify a quantity or power of sound. In some implementations, the value may be specified as a qualitative value such as one or more of "high," "mid," "low," and/or other descriptive terms. In some implementations, the value may be specified as a quantitative value such as a measurement in terms of decibels.

A value of a tempo attribute may specify a speed or pace of sound. In some implementations, the value may be specified as a qualitative value such as one or more of "fast," "medium," "slow," and/or other descriptive terms. In some implementations, the value may be specified as a quantitative value such as beats per minute (bpm).

Sensor component 110 may be configured to obtain output signals from one or more sensors 125 coupled to user device 102. The output signals may convey user input information. The user input information may define user input by a user via one or more sensors 125 of the user device 102.

Audio assessment component 112 may be configured to determine a user profile and/or other information. Determining the user profile may be based on the user input information and/or other information. The user profile may include one or more user values of the one or more audio attributes. In some implementations, the user profile may include a first user value of the first audio attribute determined based on the user input information. In some implementations, the one or more sensors 125 may include the audio input sensor. Accordingly, the user profile may be based on the user input information comprising audio information. The user profile may characterize the audio input by the user, e.g., humming.

Audio assessment component 112 may be configured to compare the user profile with the audio profile to determine, for individual audio attributes, one or more differences between individual presentation values and individual user values of the individual audio attributes. By way of non-limiting illustration, the one or more differences may include a first difference between the first presentation value and the first user value. In some implementations, the comparison may facilitate determining how well the user is humming with the song.

In some implementations, audio output component 108 may be configured to adjust, in real time, the audio profile to provide auditory feedback reflecting the one or more differences. The adjustment may be based on the one or more differences so that the presentation of the audio content is also changed in real time. The adjustment to the audio profile may include changing to the individual presentation values to match, and/or substantially match, the individual user values. By way of non-limiting illustration, the first presentation value may be adjusted by the first difference in order to match the first user value. This auditory feedback may change one or more attributes of the song based on how the user is doing. By way of non-limiting illustration, if the user starts humming incorrectly (e.g., off pitch), the song will also change (e.g., to match the user's pitch). This way the user may hear the song is playing incorrectly, to illicit the user to change their input. That is, the better the song sounds, the better the user may be humming, while the worse the song sounds, the worse the user may be humming. In some implementations, user engagement with the user device may include engagement with one or more physical input devices at one or more specified points in time (e.g., pressing a physical button on beat with a note).

Audio assessment component 112 may be configured to determine one or more scores reflecting the one or more differences. Individual scores may be represented by individual numerical values and/or other values. Relatively larger numerical values may be attributed to relatively lesser differences between the individual presentation values and the individual user values. Relatively smaller numerical values may be attributed to relatively greater differences between the individual presentation values and the individual user values. In some implementations, a first score is determined based on the first difference.

In some implementations, individual scores may be determined at individual points in time and/or for the audio content as a whole. In some implementations, individual scores may be determined for individual audio attributes, and/or aggregated for a set of audio attributes to produce an aggregated score. Aggregated may refer to averaging, weighting, and/or other measures.

In some implementations, individual scores may comprise numerical values determined on a scale. By way of non-limiting illustration, a scale may be between zero and ten, and/or other ranges. A ten may represent relatively little to no differences between the individual presentation values and the individual user values. A zero may represent a relatively largest difference between the individual presentation values and the individual user values. The relatively little to no difference may be determined based on a low end threshold. The low end threshold may be based on a percentage of a presentation value. By way of non-limiting illustration, a relatively little to no difference between a presentation value and a user value may be specified when the user value is less than and/or equal to the low end threshold percentage of the presentation value in difference. By way of non-limiting illustration, the low end threshold percentage may be 5% and/or other value. The relatively largest difference may be determined based on a high end threshold. The high end threshold may be based on a percentage of a presentation value. By way of non-limiting illustration, a relatively largest difference between a presentation value and a user value may be specified when the user value is more than and/or equal to the high end threshold percentage of the presentation value in difference. By way of non-limiting illustration, the threshold percentage may be 50% and/or other value.

In some implementations, game component 114 may be configured to facilitate gameplay via presentation of a game interface and/or other information. The game interface may depict the one or more scores, a representation of the one or more scores, and/or other depictions.

In some implementations, a game interface may include one or more user interface elements. A user interface element may include one or more of a game score indicator, a task description, avatar customization element, social feed/share button, avatar/multi-player Scoreboard, a comment Section and/or other elements. A task description may provide information related to current gameplay, including, for example, a current song to hum and/or other information. The game score indicator may display a game score and/or other information.

In some implementations, a game interface may present a simulated space. The simulated space may include one or more of the virtual space, the virtual objects, and/or other virtual content. The visual content may include views of virtual content superimposed over views of the real-world defined by the image information. Views of virtual content superimposed over views of the real-world may define an augmented reality space.

The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of a gravity-deprived space with one or more celestial bodies positioned therein). An instance executed by the computer components may be synchronous, asynchronous, and/or semi-synchronous.

The above description of the manner in which state of the simulated space is determined by a computer program component is not intended to be limiting. The computer program component may be configured to express the simulated space in a more limited, or richer, manner. For example, views determined for the simulated space representing the state of the instance of the simulated space may be selected from a limited set of graphics depicting an event in a given place within the simulated space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the simulated space are contemplated.

Within the instance(s) of the simulated space executed by game component 114, one or more users may control game entities, groups of game entities, simulated physical phenomena (e.g., wind, rain, earthquakes, and/or other phenomena), and/or other elements within the simulated space to interact with the simulated space and/or other users. The game entities may include virtual characters, such as avatars, group entities, and/or other considerations. A given game entity may be controlled by a user with which it is associated. The user-controlled element(s) may move through and interact with the simulated space (e.g., non-user characters in the simulated space, other objects in the simulated space). The user-controlled elements controlled by and/or associated with one or more users may be created and/or customized by the one or more users, based on information received by a given client computing platform, and/or may be based on other information. One or more users may have an "inventory" of virtual items, game entities, and/or currency that the one or more users can use (e.g., by manipulation of a virtual character or other user-controlled element, and/or other items) within the simulated space.

The instance of the simulated space and/or an online game that takes place therein may be persistent. That is, the simulated space and/or the game may continue on whether or not individual players are currently logged in and/or participating in the game. A user that logs out of the simulated space and then logs back in some time later may find the simulated space has been changed through the interactions of other players with the simulated space during the time the player was logged out. These changes may include changes to the simulated physical space, changes in the user's inventory, changes in other user's inventories, changes experienced by non-player characters, changes to the virtual items available for use in the game, and/or other changes In some implementations, individual virtual objects may be configured to experience locomotion. The virtual objects may have one or more visual depictions. By way of non-limiting illustration, a virtual object may depict one or more of a real-world entity (e.g., humans and/or animals), a fantastical entity (e.g., one or more of monsters, aliens, animated movie/TV characters, and/or other entities), a real-world object (e.g., furniture, food), a shape (e.g., a star-shape), and/or other entities and/or objects.

In some implementations, game component 114 may be configured to modify individual virtual objects based on user input, one or more scores, a particular game, and/or other information. In some implementations, modification may include one or more of causing one or more virtual objects to disappear, causing one or more virtual objects to experience locomotion, and/or other modifications. By way of non-limiting illustration, a virtual object representing the user may experience locomotion based on the one or more scores. Higher scores may cause the virtual object to experience locomotion which depicts positive feedback (e.g., the virtual object dances, smiles, etc.). Lower scores may cause the virtual object to experience locomotion which depicts negative feedback (e.g., the virtual object slumps over, frowns, etc.).

It is noted that the above description of gameplay and/or modifications to virtual objects are provided for illustrative purposes only and are not to be considered limiting. Instead, those skilled in the art may appreciate that different types of gameplay and/or virtual object modifications may be provided within the scope of the present disclosure.

In some implementations, brush assessment component 116 may be configured to determine user brushing information conveying a user brushing profile. Determining the user brushing information may be based on the user input information and/or other information. The user brushing profile may define one or more user brushing values of one or more brushing attributes. The one or more brushing attributes may characterize brushing behavior of the user. A user brushing profile of a given user may be unique to that given user. The one or more brushing attributes may include one or more of a brushing duration attribute, a brushing pressure attribute, a brushing angle attribute, and/or other brushing attributes.

A value of a brushing duration attribute may specify a duration of brushing. The duration of brushing may be specified as brushing duration in its entirety, a duration of a portion of the brushing (e.g., brushing a given tooth and/or section of the mouth), and/or may be expressed in other ways. A brushing duration may be specified based on units of time, including one or more of seconds, minutes, etc.

A value of a brushing pressure attribute may be determined based on pressure information derived from a pressure sensor. The value may include a force per unit area imparted on a given tooth, over a given period of time, over a given portion of the mouth, and/or may be expressed in other ways.

A value of a brushing angle attribute may be determined based on orientation information derived from output signals of an orientation sensor. In some implementations, the value may include one or more of a pitch angle, a roll angle, a yaw angle, heading, pointing direction, and/or other measurements. The value may be determined for a given tooth, over a given period of time, over a given portion of the mouth, and/or may be expressed in other ways.

In some implementations, brush assessment component 116 may be configured to obtain target brushing information conveying a target brushing profile. The target brushing profile may define one or more target values of the one or more brushing attributes. The one or more target values may represent dentist recommended values of the individual brushing attributes.

In some implementations, brush assessment component 116 may be configured to compare the user brushing profile with the target brushing profile. Such comparison may determine, for individual brushing attributes, one or more brushing differences between individual user brushing values and individual target values of the individual brushing attributes. Brush assessment component 116 may be configured to determine one or more brushing scores reflecting the one or more brushing differences. The utilization of brushing scores may provide information about brushing habits which may be helpful to parents of young users, while other scores may provide a way to gamify brushing and make it fun. The brushing scores may additionally and/or alternatively be presented to in a game interface.

Figure 4:
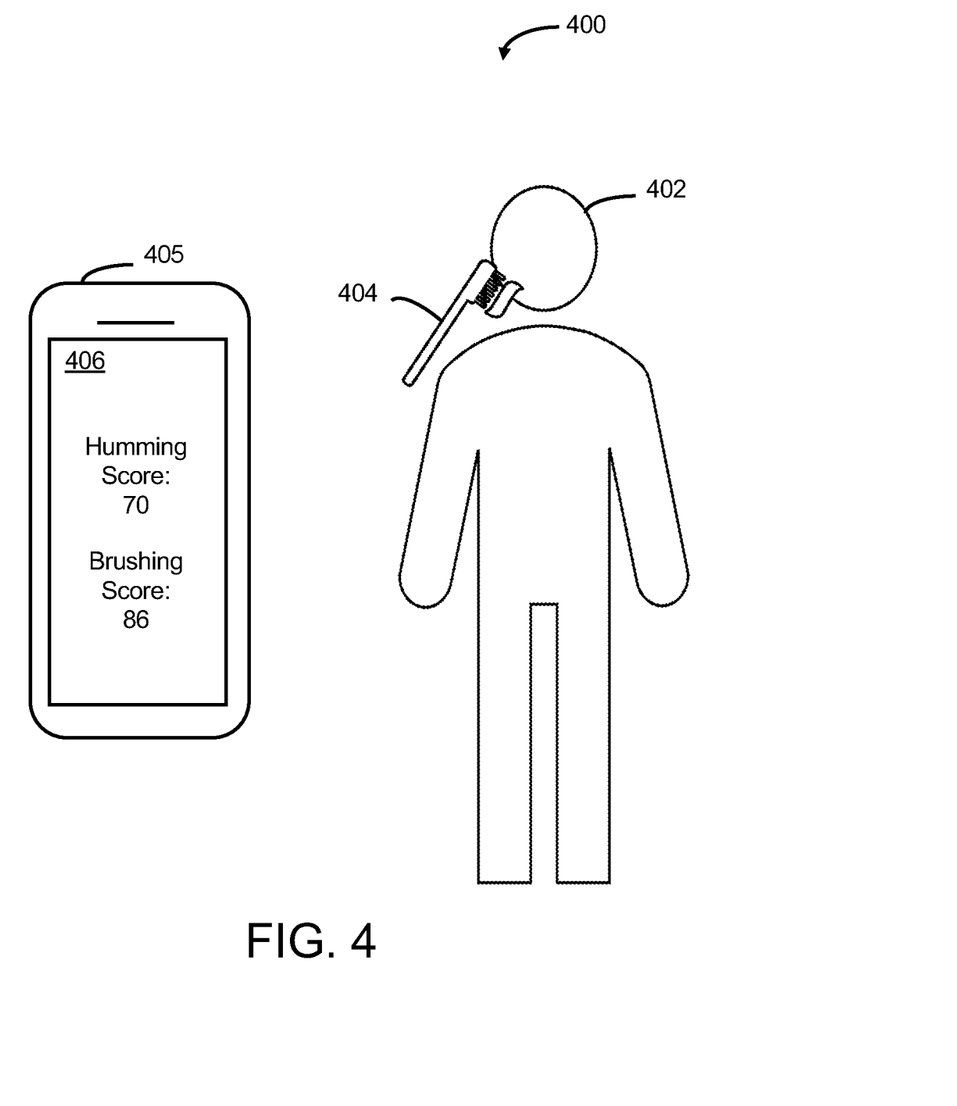
FIG. 4 illustrates an implementation of a system configured to improve user brushing behavior.

FIG. 4 illustrates an implementation of a system 400 configured to improve user brushing behavior. The system 400 may be the same as and/or similar to system 100 in FIG. 1. The system 400 may include one or more of a user device 404, a computing platform 405, and/or other components. The user device 404 may comprise a toothbrush including one or more sensors, one or more wireless communication components, one or more audio output devices, and/or other components. In use, a user 402 may brush their teeth. A song may be played. The user may hum while brushing their teeth. One or more scores may be determined. The one or more scores may be reflected in a game interface 404 presented on the computing platform 405.

Returning to FIG. 1, user device 102, one or more computing platforms 122, one or more other user devices 126, external resource(s) 124, and/or other components may be operatively linked via one or more electronic communication links. For example, such electronic communication links may be established, at least in part, via one or more networks 120. One or more networks 120 may include the Internet and/or other networks. It will be appreciated that this is not intended to be limiting and that the scope of this disclosure includes implementations in which components of system 100 may be operatively linked via some other communication media.

External resource(s) 124 may include sources of information, hosts, and/or providers of information outside of system 100, external entities participating with system 100, and/or other resources. In some implementations, some or all of the functionality attributed herein to external resource(s) 124 may be provided by resources included in system 100.

Illustration of user device 102 in FIG. 1 is not intended to be limiting. User device 102 may include a plurality of hardware, software, and/or firmware components operating together to provide the functionality attributed herein to user device 102. For example, user device 102 may be implemented by a cloud of computing platforms operating together as user device 102.

Electronic storage 118 may include electronic storage media that electronically stores information. The electronic storage media of electronic storage 118 may include one or both of system storage that is provided integrally (i.e., substantially non-removable) with user device 102 and/or removable storage that is removably connectable to user device 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in user device 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-116 by software; hardware; firmware; some combination of software, hardware, and/or firmware; and/or other mechanisms for configuring processing capabilities on processor(s) 104. Processor(s) 104 may be included in user device 102, computing platform(s) 122, and/or one or more other user devices 126.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 2:
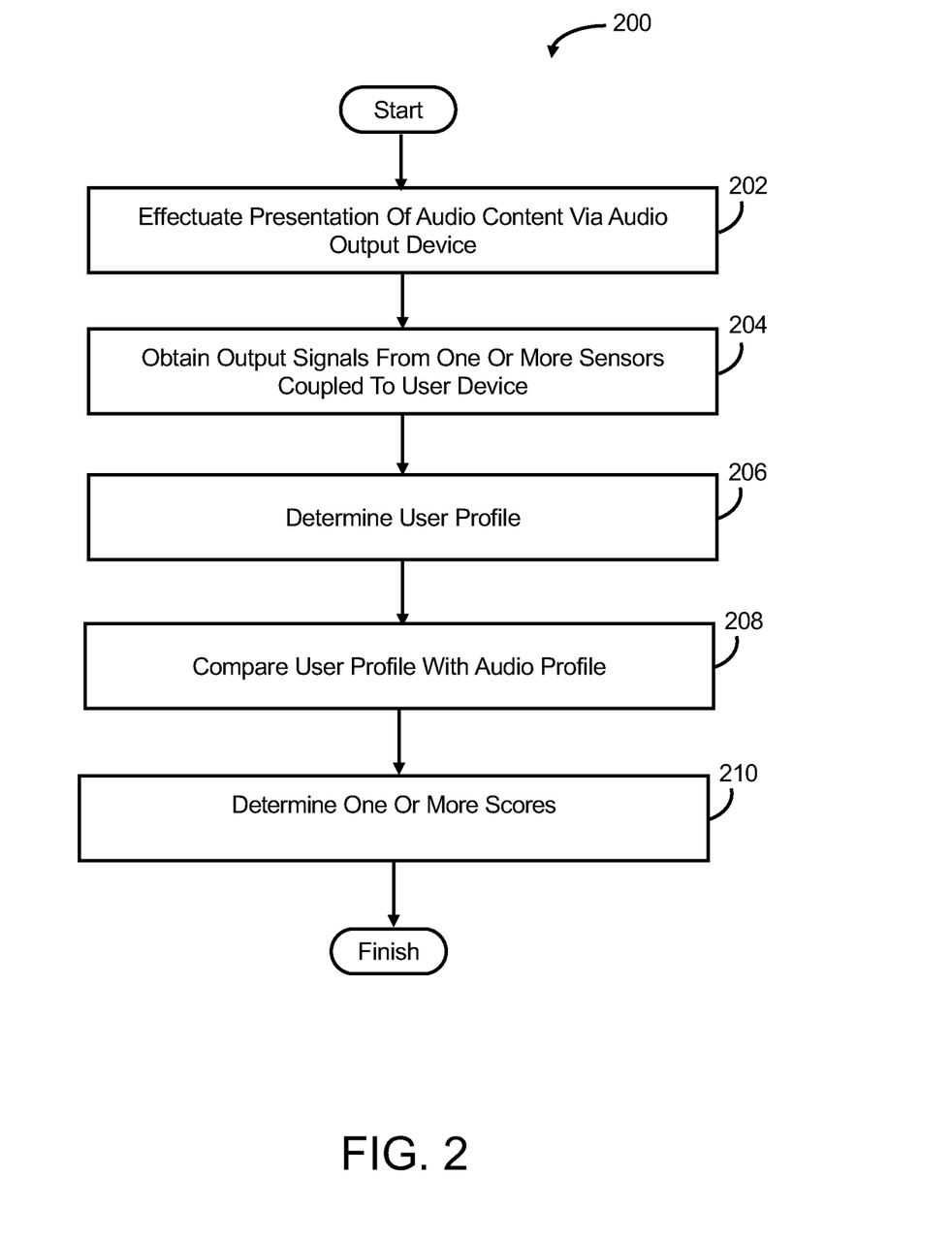
FIG. 2 illustrates a method to improve user brushing behavior, in accordance with one or more implementations.

FIG. 2 illustrates a method 200 to improve user brushing behavior. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more user devices, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, presentation of audio content via an audio output device may be effectuated. In some implementations, operation 202 may be performed by one or more physical processors executing an audio output component the same as or similar to audio output component 108 (shown in FIG. 1 and described herein).

At an operation 204, output signals from one or more sensors coupled to a user device may be obtained. The output signals may convey user input information. The user input information may define user input by a user via the user device. In some implementations, operation 204 may be performed by one or more physical processors executing a sensor component the same as or similar to a sensor component 110 (shown in FIG. 1 and described herein).

At an operation 206, a user profile may be determined. Such determination may be based on the user input information. The user profile may include one or more user values of the one or more audio attributes. In some implementations, operation 206 may be performed by one or more physical processors executing an audio assessment component the same as or similar to audio assessment component 112 (shown in FIG. 1 and described herein).

At an operation 208, the user profile may be compared with the audio profile. Such comparison may be to determine, for individual audio attributes, one or more differences between individual presentation values and individual user values of the individual audio attributes. The user profile may include one or more user values of the one or more audio attributes. In some implementations, operation 208 may be performed by one or more physical processors executing an audio assessment component the same as or similar to audio assessment component 112 (shown in FIG. 1 and described herein).

At an operation 210, one or more scores reflecting the one or more differences may be determined. In some implementations, operation 210 may be performed by one or more physical processors executing an audio assessment component the same as or similar to audio assessment component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to improve user brushing behavior, the system comprising:
   one or more physical processors configured by machine-readable instructions to:
   effectuate presentation of audio content via an audio output device, the audio content being characterized by an audio profile, the audio profile including one or more presentation values of one or more audio attributes, the one or more audio attributes including one or more of a duration attribute, a pitch attribute, an intensity attribute, a tone attribute, a timbre attribute, a key attribute, a volume attribute, or a tempo attribute, such that the audio content is characterized by a first presentation value of a first audio attribute;
   obtain output signals from one or more sensors coupled to a toothbrush device, the output signals conveying user input information, the user input information defining user input by a user via the toothbrush device;
   determine, based on the user input information, a user profile, the user profile including one or more user values of the one or more audio attributes, such that the user profile includes a first user value of the first audio attribute determined based on the user input information;
   compare the user profile with the audio profile to determine, for individual audio attributes, one or more differences between individual presentation values and individual user values of the individual audio attributes, the one or more differences including a first difference between the first presentation value and the first user value; and determine one or more scores reflecting the one or more difference such that a first score is determined based on the first difference.

2. The system of claim 1, wherein the one or more sensors coupled to the toothbrush device include one or more of an audio input sensor, an inertial measurement unit, or a pressure sensor.

3. The system of claim 2, wherein the audio output device is coupled to the toothbrush device.

4. The system of claim 3, wherein the toothbrush device comprises a brush head and a handle, wherein the audio output device is in the handle of the toothbrush device, and the one or more sensors are in the brush head of the toothbrush device.

5. The system of claim 1, wherein the one or more physical processors are further configured by the machine-readable instructions to:
adjust, in real time, the audio profile based on the one or more differences so that the presentation of the audio content is changed in real time to provide auditory feedback reflecting the one or more differences, the adjustment to the audio profile including changes to the individual presentation values to match the individual user values, such that the first presentation value is adjusted by the first difference in order to match the first user value.

6. The system of claim 1, wherein the one or more physical processors are further configured by the machine-readable instructions to:
effectuate presentation of a game interface on a display, the game interface depicting the one or more scores.

7. The system of claim 6, wherein the display is part of the toothbrush device or a computing platform.

8. The system of claim 7, wherein individual scores are represented by individual numerical values, and wherein relatively larger numerical values are attributed to relatively lesser differences between the individual presentation values and the individual user values, and relatively smaller numerical values are attributed to relatively greater differences between the individual presentation values and the individual user values.

9. The system of claim 1, wherein the one or more physical processors are further configured by the machine-readable instructions to:
determine, based on the user input information, user brushing information conveying a user brushing profile, the user brushing profile defining one or more user brushing values of one or more brushing attributes, the one or more brushing attributes characterizing brushing behavior of the user, such that the one or more brushing attributes include one or more of a brushing duration attribute, a brushing pressure attribute, or a brushing angle attribute.

10. The system of claim 9, wherein the one or more physical processors are further configured by the machine-readable instructions to:
obtain target brushing information conveying a target brushing profile, the target brushing profile defining one or more target values of the one or more brushing attributes;
compare the user brushing profile with the target brushing profile to determine, for individual brushing attributes, one or more brushing differences between individual user brushing values and individual target values of the individual brushing attributes; and
determine one or more brushing scores reflecting the one or more brushing differences.

11. A method to improve user brushing behavior, the method comprising:
effectuating presentation of audio content via an audio output device, the audio content being characterized by an audio profile, the audio profile including one or more presentation values of one or more audio attributes, the one or ore audio attributes including one or more of a duration attribute, a pitch attribute, an intensity attribute, a tone attribute, a timbre attribute, a key attribute, a volume attribute, or a tempo attribute, such that the audio content is characterized by a first presentation value of a first audio attribute;
obtaining output signals from one or more sensors coupled to a toothbrush device, the output signals conveying user input information, the user input information defining user input by a user via the toothbrush device;
determining, based on the user input information, a user profile, the user profile including one or more user values of the one or more audio attributes, such that the user profile includes a first user value of the first audio attribute determined based on the user input information;
comparing the user profile with the audio profile to determine, for individual audio attributes, one or more differences between individual presentation values and individual user values of the individual audio attributes, the one or more differences including a first difference between the first presentation value and the first user value; and
determining one or more scores reflecting the one or more differences, such that a first score is determined based on the first difference.

12. The method of claim 11, wherein the one or more sensors coupled to the toothbrush device include one or more of an audio input sensor, an inertial measurement unit, or a pressure sensor.

13. The method of claim 12, wherein the audio output device is coupled to the toothbrush device.

14. The method of claim 13, wherein the toothbrush device comprises a brush head and a handle, wherein the audio output device is in the handle of the toothbrush device, and the one or more sensors are in the brush head of the toothbrush device.

15. The method of claim 11, further comprising:
adjusting, in real time, the audio profile based on the one or more differences so that the presentation of the audio content is changed in real time to provide auditory feedback reflecting the one or more differences, the adjustment to the audio profile including changes to the individual presentation values to match the individual user values, such that the first presentation value is adjusted by the first difference in order to match the first user value.

16. The method of claim 11, further comprising:
effectuating presentation of a game interface on a display, the game interface depicting the one or more scores.

17. The method of claim 16, wherein the display is part of the toothbrush device or a computing platform.

18. The method of claim 17, wherein individual scores are represented by individual numerical values, and wherein relatively larger numerical values are attributed to relatively lesser differences between the individual presentation values and the individual user values, and relatively smaller numerical values are attributed to relatively greater differences between the individual presentation values and the individual user values.

19. The method of claim 11, further comprising:
determining, based on the user input information, user brushing information conveying a user brushing profile, the user brushing profile defining one or more user brushing values of one or more brushing attributes, the one or more brushing attributes characterizing brushing behavior of the user, such that the one or more brushing attributes include one or more of a brushing duration attribute, a brushing pressure attribute, or a brushing angle attribute.

20. The method of claim 19, further comprising:
obtaining target brushing information conveying a target brushing profile, the target brushing profile defining one or more target values of the one or more brushing attributes;
comparing the user brushing profile with the target brushing profile to determine, for individual brushing attributes, one or more brushing differences between individual user brushing values and individual target values of the individual brushing attributes; and
determining one or more brushing scores reflecting the one or more brushing differences.

\* \* \* \* \*

UNITED STATES PATENT AND TRADEMARK OFFICE
CERTIFICATE OF CORRECTION

| | |
|---|---|
| PATENT NO. | : 11,615,715 B2 |
| APPLICATION NO. | : 16/852160 |
| DATED | : March 28, 2023 |
| INVENTOR(S) | : Michael Goslin |

It is certified that error appears in the above-identified patent and that said Letters Patent is hereby corrected as shown below:

In the Claims

In Claim 11, Column 16, Line 7, please delete "one or ore" and insert --one or more--, therefor.

Signed and Sealed this
Second Day of May, 2023

Katherine Kelly Vidal
*Director of the United States Patent and Trademark Office*